Oct. 21, 1924.

G. L. A. FRIEDRICHS 1,512,591

PROCESS FOR PRESERVING PERISHABLE PRODUCTS

Filed Jan. 8, 1921

Inventor
Gottfried L. A. Friedrichs
By his Attorney
W. T. Criswell.

Patented Oct. 21, 1924.

1,512,591

UNITED STATES PATENT OFFICE.

GOTTFRIED L. A. FRIEDRICHS, OF NEW YORK, N. Y.

PROCESS FOR PRESERVING PERISHABLE PRODUCTS.

Application filed January 8, 1921. Serial No. 435,876.

*To all whom it may concern:*

Be it known that I, GOTTFRIED L. A. FRIEDRICHS, a subject of Germany, and a resident of New York, in the county of New York and State of New York, have invented a certain new and useful Process for Preserving Perishable Products, of which the following is a full, clear, and exact specification.

This invention relates to a process adapted to be used for keeping certain classes of food products from spoiling.

When fish, meat, fruit and other perishable food products are kept for a period of time before consumption various methods of refrigeration are employed for their preservation. These methods are frequently unsuccessful, because of lack of facilities to maintain effectual oxygenation of the atmosphere surrounding the products, and in instances the products while being prevented from actual deterioration are often contaminated to the extent of being unhealthful for consumption from lack of the presence of sufficient oxygen. Moreover, no efficient method is known for enabling fish and the like to be safely transported alive to distant places also for want of maintaining a proper supply of oxygen, and though running water is often employed for such a purpose it is well known that the natural supply of oxygen is not sufficient to reliably sustain the lives of the fish.

My invention has for its object primarily to overcome these objections by providing a process consisting of maintaining in the area surrounding and occupied by the products a constant supply of oxygen other than the natural supply contained in the atmosphere of the area.

With these and other objects in view, the invention will be hereinafter more fully described with reference to the accompanying drawing forming a part of this specification in which similar characters of reference indicate corresponding parts in all the views, and will then be pointed out in the claim at the end of the description.

In the drawing, Figure 1 is an elevation of a form of apparatus designed to carry into practice the process embodying my invention.

Figure 1:
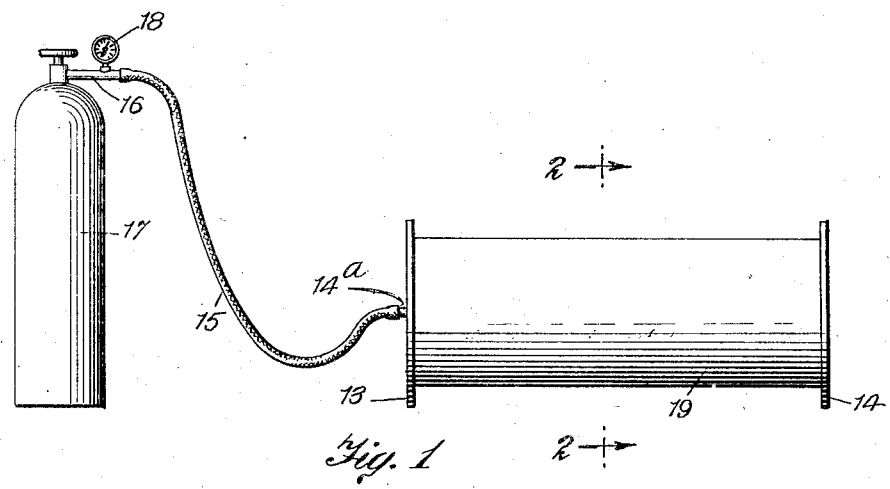
Figures 2, 3:
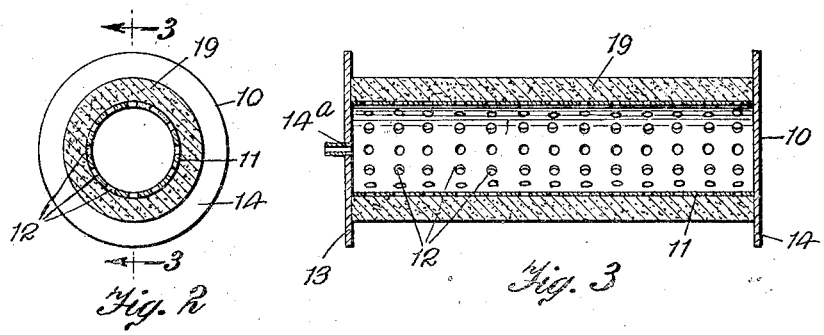
Fig. 2 is a cross section taken on the line 2—2 of Fig. 1.
Fig. 3 is a longitudinal section taken on the line 3—3 of Fig. 2.
Figure 4:
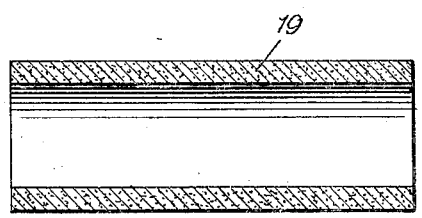
Fig. 4 is a section taken through the distributer or porous jacket used in the apparatus.

The process may be practiced by employing any appropriate means to effectuate a slow dissipated discharge of oxygen gas so that it will be distributed in fine globular or molecular form in the area surrounding perishable food products, though I prefer to employ for carrying out the process the type of apparatus illustrated in the accompanying drawing.

This apparatus is composed of a receiving chamber 10 having a cylindrical wall 11 with spaced holes or perforations 12 to serve as outlets. The ends of the annular wall 11 are closed by plates, as 13 and 14, and in the end plate 13 is an inlet 14ª in the form of a nipple to which is held one end of a pipe 15 leading from the outlet valve 16 of a tank of oxygen gas 17, the discharge of the gas through the valve being controlled by a suitable gage, as 18, which is provided on the valve. The regulated supply of the oxygen flowing from the tank through its valve and through the pipe will be delivered through the inlet 14 into the chamber 10 for discharge through the outlets 12 of the wall 11 of the chamber. On the exterior of the perforated cylindrical wall 11 of the chamber 10 is a distributer 19 which is in the form of a tubular jacket preferably of small particles of hard carbon which is compressed in a manner so that the space between the particles provide small broken or irregular pores or ducts therethrough so that the flow of oxygen delivered from the outlets or perforations 12 of the chamber 10 will be divided or dissipated into a small globular or molecular form as well as the flow of the gas being retarded, in order to obviate an excess of the gas being distributed. These parts of my apparatus are similar in construction to those disclosed in my Patent No. 1,405,775, filed February 7, 1922.

The apparatus is used for practicing my process by arranging the chamber 10 with the distributer 19 in proximity to the products when in storage or in transportation so that the preservative gas or oxygen may flow in contact with the products as well as permeating the atmosphere of the area occupied and surrounding the products, the volume of supply of the gas being regulated by the gage of the tank which is also arranged at a convenient place. In order to keep fish and the like alive when shipped in water from place to place the chamber 10 and distributer 19 are positioned so that the water will be kept constantly charged with a given supply of oxygen other than the natural supply contained in the water. Thus an effectual process is provided whereby fish, meat, fruit and other perishable products may be safely preserved from contamination during their storage prior to consumption.

Having thus described my invention, I claim as new and desire to secure by Letters Patent:—

The process for preserving living fish when transported, which consists of delivering to a closed chamber having a porous wall a regulated supply of oxygen gas whereby the gas will pass through the pores of the chamber for oxygenating the surrounding atmosphere.

This specification signed and witnessed this 7th day of January, A. D. 1921.

GOTTFRIED L. A. FRIEDRICHS.

Witnesses:
J. FRANK,
J. FREDERICK CRYER.